(No Model.) 2 Sheets—Sheet 1.
L. P. MALLÉE.
Gridiron.
No. 239,332. Patented March 29, 1881.
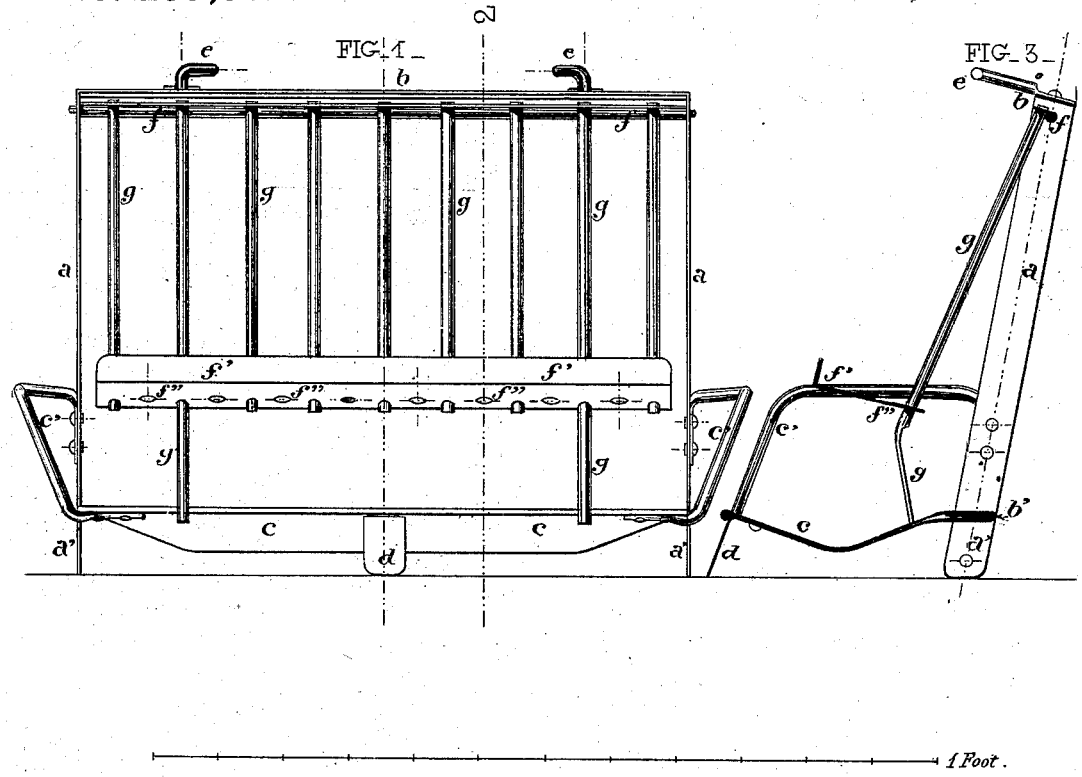
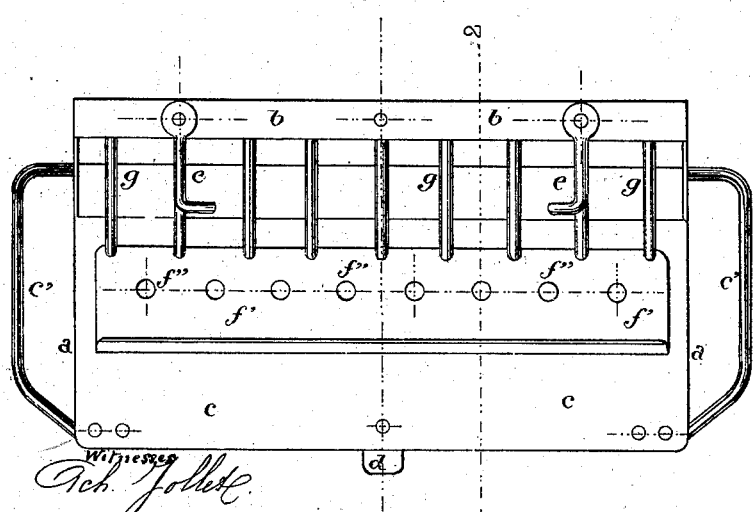

(No Model.) 2 Sheets—Sheet 2.
L. P. MALLÉE.
Gridiron.
No. 239,332. Patented March 29, 1881.
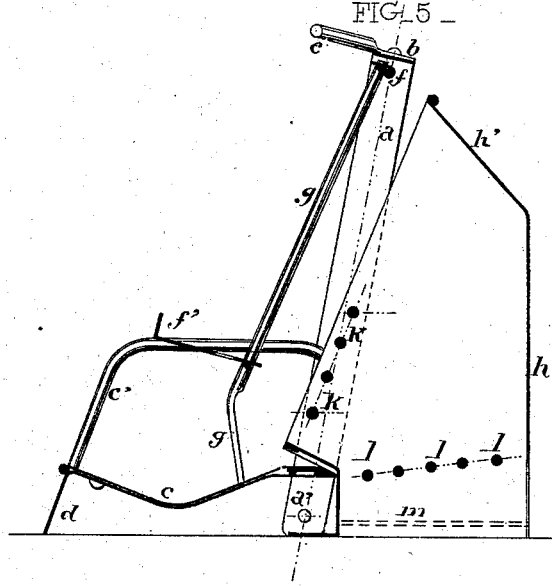
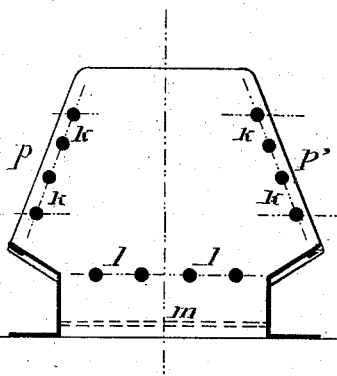
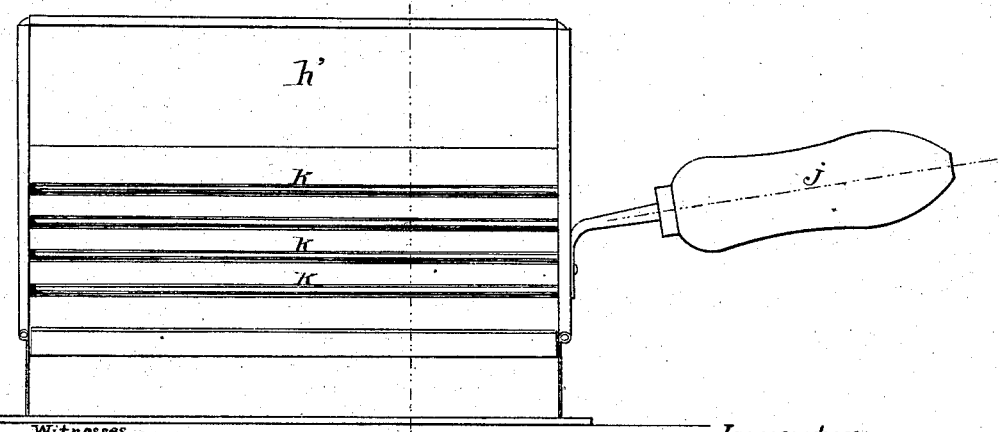

UNITED STATES PATENT OFFICE.

LUCIEN P. MALLÉE, OF PARIS, FRANCE.

GRIDIRON.

SPECIFICATION forming part of Letters Patent No. 239,332, dated March 29, 1881.

Application filed December 17, 1880. (No model.) Patented in France September 7, 1880.

*To all whom it may concern:*

Be it known that I, LUCIEN PIERRE MALLÉE, of Paris, in the Republic of France, have invented a new Gridiron for Steaks, Fishes, &c., (for which I have obtained Letters Patent of France for fifteen years, dated September 7, 1880, No. 138,606;) and I do hereby declare that the following is a full and exact description thereof, reference being made to the accompanying drawings.

This invention consists in a new gridiron intended for cooking and roasting meat, fishes, &c. The gridiron proper, receiving the pieces to be roasted, is arranged to be applied in front of an oven containing the fuel. Each of these parts I will describe.

In the drawings forming part of this specification I have represented the gridiron.

Figure 1 represents a front elevation of the apparatus. Fig. 2 is a plan view, and Fig. 3 is a view in a vertical section on the line 1 2. The oven is shown in vertical section in Fig. 5 on the line 3 4 of the elevation, Fig. 4. Fig. 5 shows the gridiron placed against the oven, showing the complete broiling apparatus.

The gridiron proper, Figs. 1, 2, and 3, is made of tin, and formed of two inclined posts, $a$ $a$, which on top are connected by a cross-piece, $b$. The lower ends, $a'$ $a'$, of these posts constitute the feet of the apparatus. The aforesaid posts $a$ $a$ are also connected by a plate, $b'$, on or of which is formed the basin $c$, which has its ends $c'$ $c'$ furnished with handles in order to permit the transportation of the apparatus. These handles are riveted on one side to the posts $a$ $a$ and on the other side to the basin $c$. Under the basin, in the middle and in front, is a third foot, $d$.

The upper cross-piece, $b$, is provided with two (more or less) pegs or hooks, $e$ $e$, intended for holding the meat.

Between the posts $a$ $a$ is placed the grate $g$, composed of two horizontal cross-pieces, $f f'$, and round bars $g$ $g$. The top cross-piece, $f$, has spindles at each end that move in two holes made into the posts $a$ $a$, so as to allow the grate $g$ to be swung or taken up, if convenient. The lower cross-piece, $f'$, which holds the lower end of the meat, is a rather large metallic plate bent in order to form a flange. It has holes $f''$ to let the gravy escape. This cross-piece $f'$ is traversed by two of the bars $g$ $g$, which stand on the basin $c$.

The oven, Figs. 4 and 5, is made of cast or sheet iron. Its shape is that of a box shut on three sides—to wit, at the back and right and left. The back $h$ is bent obliquely at the top, at $h'$, so as to be a reflector for the heat. The front is open and furnished with horizontal bars $k$ $k$ parallel to those $g$ $g$ of the grate. The part underneath this open face forms a re-entering angle with plain edges.

The grate sustaining the coal is formed by bars $l$ $l$ slightly inclined. On one of the lateral sides a handle, $j$, is fixed.

The portable oven I have just described does not require any ash-pan, as it can be placed on all descriptions of kitchen-ovens in which the ashes fall. Nevertheless, by means of a movable plate of sheet-iron, $m$, which is indicated by dotted lines, and that could be placed under the grate $l$, this sort of oven can be used in any place whatever.

For use the oven or grate $l$ must be filled with burning coals, then placed near the gridiron which holds the meat, as in Fig. 5, the projecting part of the oven entering between the posts $a$, so as to bring the fire closer to the meat. During cooking the melting fat and the juices of the meat run along the bars $g$ and drop into the basin $c$.

The gridiron may be taken nearer to or farther from the fire.

My system admits of the use of two gridirons by using a peculiar oven, (cross-section Fig. 6,) the two faces $p$ $p'$ of which are open, and have each the bars $k$ $k$, as in the single oven. The top is open in order to receive the coals, but may be shut with a movable cover.

For using the double gridiron it is necessary to place the oven in the middle upon a chafing-dish and to put against its open faces gridirons like that shown in Figs. 1, 2, and 3.

When the cooking is finished the oven is removed and the coals thrown into the chafing-dish or extinguisher.

The grease received into the basin of the gridiron, not having been burned or blackened, as in usual gridirons, can be kept and used for frying, or for pies or puddings.

I claim—

In a gridiron, the pivoted grate $g$, combined with the posts $a$, hooks $e$, and dish $c$, said grate having a sufficient inclination to maintain the pieces of meat to be roasted, and at the same time to prevent the grease and gravy from dropping upon the fire, substantially as herein shown and described.

LUCIEN P. MALLÉE.

Witnesses:
ACH. JOLLET,
A. BLÉTRY.